United States Patent Office

3,035,976
Patented May 22, 1962

3,035,976
BRONCHODILATOR COMPOSITION AND METHOD
Eugene T. Kimura, Winthrop Harbor, Ill., assignor to Abbott Laboratories, Chicago, Ill., a corporation of Illinois
No Drawing. Filed May 4, 1959, Ser. No. 810,600
5 Claims. (Cl. 167—65)

This invention relates to a novel use of the compound, 1 - (p - chlorobenzhydryl) - 4 - methylhomopiperazine. In particular, it relates to compositions and methods which utilize the bronchodilator properties of the aforesaid compound.

The base, 1-(p-chlorobenzhydryl)-4-methylhomopiperazine, is represented by the following structure:

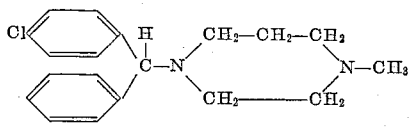

The base is a liquid which is insoluble in water. The acid addition salts of the base are solids which are soluble in water. The dihydrochloride salt of the base is a white powder which is soluble in water to more than 5% and is stable in solution.

It has now been found that 1-(p-chlorobenzhydryl)-4-methylhomopiperazine and the non-toxic salts thereof possess potent pharmacological properties as bronchodilators which renders them useful in relieving distress associated with asthma. This discovery is surprising and unexpected because nothing in the art discloses or suggests such a property, and the known antihistaminic properties of the compounds disclosed herein would not suggest usefulness as bronchodilators. Many antihistaminics have been tested as possible bronchodilators without success. This has led to a conviction in the art that antihistaminics are inoperable per se as bronchodilators and that no correlation between the foregoing pharmacological properties exists.

The generic term "homochlorcyclizine" is employed herein to designate the base, 1-(p-chlorobenzhydryl)-4-methylhomopiperazine and the acid addition salts of said base. The term "acid addition salts" is intended to include the salts well known to those versed in the art. Without implying any restriction, selected acid addition salts may be prepared from the inorganic acids such as sulfuric, phosphoric, hydrochloric, hydrobromic, hydriodic, sulfamic and the like. Organic acids may also be employed to prepare acid addition salts such as citric, lactic, maleic, malic, succinic, tartaric, cinnamic, acetic, benzoic, gluconic, ascorbic, cylohexylsulfamic and related acids.

An object of this invention is to provide a method for utilizing the bronchodilator properties of homochlorcyclizine.

Another object of this invention is to provide a method for alleviating asthmatic distress.

Still another object of this invention is to provide useful composition forms containing homochlorcyclizine.

A still further object of this invention is to present a pharmaceutical composition in unit dosage forms useful in alleviating bronchial spasms and constrictions.

In the accomplishment of the foregoing objects and in accordance with the teachings of this invention, a method is now provided for relieving bronchial constrictions by administering homochlorcyclizine in a pharmaceutical form. Homochlorcyclizine is found to be both safe and effective in the operation of this method.

The active ingredient, 1-(p-chlorobenzhydryl)-4,-methylhomopiperazine, can be prepared by adding 60 gms. (0.55 mole) of N-methylhomopiperazine and 61 gms. (0.57 mole) of sodium carbonate to a two liter three-necked flask containing 300 ml. of xylene. This mixture is heated to 130–135° C. and a solution of 135 gms. (0.57 mole) of p-chlorobenzhydryl chloride in 350 ml. of xylene is added dropwise to the flask over a one-hour period. The mix is heated at reflux temperature for 18–24 hours. The contents of the flask are cooled to 25–30° C. and the solids are dissolved in water. To this mixture is added 300 ml. of 18% hydrochloric acid. The aqueous layer is separated and the xylene layer is washed with two 50 ml. portions of 10% hydrochloric acid. To the combined acid extracts is added 250 ml. of 50% sodium hydroxide. The organic layer is extracted with three 200 ml. portions of benzene. The benzene is removed and the residue is distilled at 1–.05 mm. of mercury. The product is collected as an oil in a yield of 56%, B.P. 177° C. (0.8 mm.), $n_D^{25}$ 1.5804.

Analysis. — Calcd. for $C_{19}H_{23}ClN_2$. Theory: N, 8.90%. Found: N, 8.82%.

The dihydrochloride salt of 1-(p-chlorobenzhydryl)-4-methylhomopiperazine is prepared by dissolving the distilled base collected in the foregoing illustration in 300 ml. of 99% isopropyl alcohol. This solution is gassed with anhydrous hydrogen chloride and the alcohol solvent is allowed to reflux. The mixture is cooled and the solid product is collected. The solid product is dissolved in hot 3A ethyl alcohol, treated with activated charcoal, cooled and the solid collected. The filter cake is washed with ether and dried in a vacuum oven at 55° C. The product, 1-(p-chlorobenzhydryl)-4-methylhomopiperazine, is collected in a yield of 11 gms. (75%), M.P. 229–231° C.

Analysis. — Calcd. for $C_{19}H_{25}Cl_3N_2$. Theory: C, 58.85%; H, 6.50%. Found: C, 59.10%; H, 6.35%.

Homochlorcyclizine has been found to be a potent bronchodilator in the in vitro tracheal chain test. This test is described by Castillo et al. in J. Pharmacol. and Exp. Therap., 90, 104–109 (1947). In this technique tracheal contractions are recorded on a kymograph. In particular, a section of guinea pig trachea, about 12 rings in length, is immersed in a tissue bath containing physiologically acceptable solutions such as Tyrode's solution. The tracheal chain is tied serially in chain fashion and a lead from such chain is fixed to a moving lever which records the contractions of the tracheal chain. Standard spasmogens, such as serotonin, histamine and acetylcholine, are added to the bath to induce contraction of the tracheal chain. The effectiveness of a bronchodilator drug is evaluated according to its ability to inhibit said standard spasmogens. The effectiveness of bronchodilator drugs is also evaluated according to their effect on the tracheal tissue per se, that is, whether the muscles in each ring are relaxed by the drug. This is quantitated by the number of millimeters the tracing depicting tracheal contraction falls below its basal line on the kymograph.

The following data represent a comparison of homocholorcyclizine and aminophyllin. The latter compound is a well-known and accepted medicament in the treatment of bronchial spasms.

COMPARATIVE BRONCHODILATOR PROPERTIES OF HOMOCHLORCYCLIZINE (DIHYDROCHLORIDE) AND AMINOPHYLLIN

| Gammas/ml. | Aminophyllin | Homochlorcyclizine |
|---|---|---|
| 2.5 | Antagonistic action: serotonin—none; acetylcholine—none; histamine—none. Relaxation: doubtful. | Antagonistic action: serotonin—75% inhibition (progressive); acetylcholine—27% inhibition; histamine—reversal (4 mm. fall). |
| 50 | Antagonistic action: serotonin—45% inhibition; histamine—none. acetylcholine—none. Relaxation: immediate and very good (19-31 mm.); effect reversed by washing. | Antagonistic action: acetylcholine—100% inhibition. Relaxation: progressive and good (9 mm.). |
| 75 | Antagonistic action: acetylcholine—none. Relaxation: immediate and very good (31 mm.); effect reversed by washing. | Antagonistic action: serotonin—100% inhibition; acetylcholine—100% inhibition; histamine—100% inhibition. Relaxation: progressive and good (10 mm.); effect not reversed by washing. |
| 100 | Antagonistic action: histamine—82% inhibition; acetylcholine—none. Relaxation: immediate and very good (20-22 mm.); effect reversed by washing. | Antagonistic action: serotonin—100% inhibition; acetylcholine—100% inhibition; histamine—100% inhibition. Relaxation: progressive, long-lasting (3½ hrs.) and good (15 mm.); effect not reversed by washing. |

The foregoing data disclose that aminophyllin produces a rapid relaxation of the chain of approximately 24 mm. at 50–100 gammas/ml. This relaxation is easily washed out after one washing. Acetylcholine and histamine are not inhibited during this relaxation state, while serotonin is inhibited 45% at 50 gammas/ml. and 82% at 100 gammas/ml. This action is easily reversed by washing. The data disclose that homochlorcyclizine causes a bronchodilator effect of the chain per se. This effect is characterized by a progressive relaxation of long duration lasting more than three hours. This effect is realized at doses of 50 to 100 gammas/ml. The action of the three spasmogens is completely blocked by homochlorcyclizine and the antispasmogenic effect against the three spasmogens and the bronchodilator effect per se is not reversed by washing. The relatively slow onset of action and long duration of action of homochlorcyclizine are highly desirable pharmacological properties.

The guinea pig is a particularly useful animal in which to study the effects of a bronchodilator drug. This is true because the guinea pig can be placed in respiratory distress by a challenge of an agent such as serotonin. Similar distress can be induced by antigens such as egg white in a pig which has been actively sensitized by repeated challenging doses of egg white. The following table presents in vivo animal studies attesting to the protection afforded by the bronchodilator properties of homochlorcyclizine:

HOMOCHLORCYCLIZINE (DIHYAROCHLARIDE) IN GUINEA PIGS

| Intraperitoneal Dose, mg./kg. | Antigen | Route | Guinea Pig | Effect |
|---|---|---|---|---|
| 20 | Serotonin Creatinine Sulfate. | Aerosol | Normal | Full Protection. |
| 15 | Egg white | do | Sensitized | Do. |
| 10 | do | I.V. | do | ⅚ Pigs Fully protected. |

A clinical study has been performed on a group of 62 patients afflicted with asthma. Homochlorcyclizine (dihydrochloride) was administered orally in tablet form at doses varying from 25 to 150 mg./day to each patient.

The clinical response to homochlorcyclizine was reported as follows:

Excellent _____ 34
Good _____ 17
Fair _____ 3
Poor _____ 8

It is evident from the foregoing data that 51 out of 62 patients showed good or excellent signs of asthmatic relief.

The bronchodilator effectiveness of homochlorcyclizine is demonstrated when administered at varying dose ranges. Such doses start at about 12½ mg./day and may be raised upwards to a level below onset of serious side effects. This dosage range generally covers from about 12½ mg./day to about 150 mg./day. It is obvious that the dose range will be governed by the age of the subject, the condition of the subject and the severity of the asthmatic affliction. The selected dosage will be determined by the expertise of the attending physician.

The bronchodilator properties of homochlorcyclizine may be utilized in various pharmaceutical forms. The drug may be administered orally in the form of tablets, capsules, powder, a flavored liquid form or an aerosol form. It may also be administered as a suppository by combining homochlorcyclizine with appropriate waxes. A preferred form of oral administration is 25 mg. scored tablets which will provide a minimum dose for children when broken in half and will further provide, in multiples, amounts up to the maximum dose. In one of the preferred forms the active ingredient, homochlorcyclizine, may be incorporated into tablets by utilizing accepted ingredients and steps in the preparation thereof. In particular, soluble diluents and tableting adjuvants such as cornstarch, acacia, lactose, talc, stearic acid, magnesium stearate, gums and the like may be used. Any of the tableting materials used in the pharmaceutical art may be employed. Incompatibility of the tableting materials with the active ingredient is the only limitation, but a limitation which is easily ascertained and avoided by the skilled compounder of pharmaceuticals. Alternatively, the active material with or without its adjuvant materials may be placed in a soft or hard gelatin capsule and administered in capsule form.

In another embodiment of the invention a solution dose form is made. The solubility of 1-(p-chlorobenzhydryl)-4-methylhomopiperazine dihydrochloride is sufficiently high to prepare a dosage level suitable for administration. A solution dosage form can contain from about 2 mg./cc. to 25 mg./cc. of the active ingredient (10 to 125 mg./teaspoon).

Sterile isotonic liquid forms can be prepared for injection into the body by placing the desired amount of homochlorcyclizine in the sterile water, adjusting the osmotic tension to coincide with the osmotic tension of body fluids, sealing said solution in an ampoule and sterilizing said ampoule.

The desirable physiological properties of homochlorcyclizine are usefully incorporated in aerosols. Mechanical aerosols may be used wherein the powder is released in minute amounts and directly inhaled. Liquefied gas-aerosols are also useful, especially for deep inhalations where the medicament must reach the small bronchial units in the lung. The latter pharmaceutical form has a liquid propellant such as dichlorodifluoromethane, mixed with the medicament in aqueous solution or dissolved in a compatible co-solvent. The combined mixture is placed in a sealed container containing an appropriate release mechanism.

The following pharmaceutical examples are presented to illustrate composition forms containing homochlorcyclizine. It is understood that said examples are not intended to restrict the dosage forms to the ingredients and proportions named therein.

Example I

A solution of homochlorcyclizine is prepared by adding 20 mg. of said homochlorcyclizine to each cc. of water. The solution is made isotonic to physiological fluids by adding sodium chloride and thereafter the solution is filtered. From this solution, a 10 cc. aliquot is placed in an ampoule, and the ampoule is sealed. The ampoules are sterilized in an autoclave at 121° C. at 10 lbs. pressure for 20 min. Immediately thereafter the ampoules are removed and cooled with running water. The prepared ampoules contain a 2% solution of homochlorcyclizine which is suitable for introduction into the body by injection.

Example II

Homochlorcyclizine (3.32 lbs.) is mixed with 37.33 lbs. of lactose and passed through a 30-mesh screen. A starch paste is prepared using 1.05 lbs. of cornstarch and 5.98 lbs. of distilled water. The prior mixture is massed with the starch paste and passed through a 4-mesh screen and then dried at 105° F. for 17 hours. The dried product is granulated and passed through a 16-mesh screen. Stearic acid (0.446 lb.), cornstarch (3.87 lbs.) and talc (2.036 lbs.) are passed through a No. 40 screen and blended well with the granulated homochlorcyclizine, lactose and cornstarch.

The blended material is compressed into scored tablets, each containing 25 mg. of active material.

Example III

HOMOCHLORCYCLIZINE (DIHYDROCHLORIDE) IN SOLUTION DOSE FORM

A pharmaceutical solution of homochlorcyclizine is prepared by combining the following ingredients:

| | | |
|---|---|---|
| Homochlorcyclizine | grams | 5.0 |
| Sucrose | do | 200.0 |
| Glycerin | cc | 150.0 |
| Aseptoform M | grams | 1.5 |
| Aseptoform P | do | 0.15 |
| F.D. & C. Orange #1 | do | 0.05 |
| Imitation orange aroma | cc | 0.02 |
| Oil orange | cc | 0.5 |
| Water, deionized, q.s. 1000.0 cc. | | |

Aseptoform M and P are trade names for esters of p-hydroxybenzoic acid which prevent fermentation and mold formation. F.D. & C. Orange #1 is a flavoring agent certified by the Food, Drug and Cosmetics Agency of the U.S. Government.

The foregoing preparation provides a concentration of the active ingredient, homochlorcyclizine, at a level of 5 mg./cc. or 25 mg./teaspoon.

Example IV

A pharmaceutical suppository of homochlorcyclizine is prepared by melting 300 grams of spermaceti, U.S.P. and 695 grams of theobroma oil, U.S.P. The mixture is cooled to 50° C. and then 25 grams of homochlorcyclizine is added. The combined mixture is stirred to a state of uniformity and then delivered to individual molds and chilled. The molds yield suppositories weighing 2 grams which melt at 50° C. Each suppository contains 50 mg. of active material.

Others may practice the invention in any of the numerous ways which will be suggested by this disclosure to one skilled in the art. All such practice of the invention is considered to be a part hereof provided it falls within the scope of the appended claims.

I claim:
1. A method for alleviating bronchial spasms which comprises administering to a subject so afflicted from about 50 mg. to about 150 mg./day of 1-(p-chlorobenzhydryl)-4-methylhomopiperazine dihydrochloride.
2. A method for alleviating bronchial spasms which comprises administering orally to a subject so afflicted from about 50 mg. to about 150 mg./day of 1-(p-chlorobenzhydryl)-4-methylhomopiperazine in a solid pharmaceutical form.
3. A method for alleviating bronchial spasms which comprises administering by injection to a subject so afflicted a sterile water solution containing about 20 mg./cc. of a non-toxic acid addition salt of 1-(p-chlorobenzhydryl)-4-methylhomopiperazine.
4. The method of alleviating bronchial spasms which comprises administering by injection to a subject so afflicted about 50 mg. to 150 mg./day of 1-(p-chlorobenzhydryl)-4-methylhomopiperazine dihydrochloride in a sterile water solution containing inert non-toxic material to provide osmotic tension.
5. A method for alleviating bronchial spasms which comprises administering orally to a patient so afflicted 1-(p-chlorobenzhydryl) - 4 - methylhomopiperazine dihydrochloride in a tablet, at a dose of from about 50 mg. to about 150 mg./day.

References Cited in the file of this patent

UNITED STATES PATENTS

| | | |
|---|---|---|
| 2,630,435 | Baltzly et al. | Mar. 3, 1953 |
| 2,655,498 | Weston et al. | Oct. 13, 1953 |

OTHER REFERENCES

Loew: Physiological Reviews, vol. 27, No. 4, October 1947, pp. 542–573, esp. pp. 551–553.

Herxheimer: British Medical Journal, Oct. 22, 1949, pp. 901–905, esp. p. 905.

P.D.R., Physicians' Desk Reference, 8th Edition, Medical Economics, Inc., Rutherford, N.J., 1953, pp. 312, 313 and 406.